United States Patent [19]

Lankester et al.

[11] 4,199,043
[45] Apr. 22, 1980

[54] LOCK ASSEMBLY FOR SHOPPING CART TO PREVENT ITS REMOVAL FROM AN AUTHORIZED AREA

[76] Inventors: John E. Lankester, 2708 Greenfield Ave.; Keith T. Flaherty, 2569 Patricia Ave., both of Los Angeles, Calif. 90064

[21] Appl. No.: 948,686

[22] Filed: Oct. 5, 1978

[51] Int. Cl.² ............................................. B60T 7/18
[52] U.S. Cl. .................................... 188/111; 188/31; 188/167; 280/33.99 C
[58] Field of Search ................... 188/31, 69, 111, 167; 280/33.99 C; 246/206

[56] References Cited

U.S. PATENT DOCUMENTS

| 1,108,794 | 8/1914 | Say | 188/111 |
| 3,029,905 | 4/1962 | Nowak | 188/111 |
| 3,366,201 | 1/1968 | Pesta | 280/33.99 C |
| 3,608,693 | 9/1971 | Stosberg et al. | 280/33.99 C X |
| 3,652,103 | 3/1972 | Higgs | 280/33.99 C |

FOREIGN PATENT DOCUMENTS

| 730591 | 3/1966 | Canada | 280/33.99 C |
| 213108 | 3/1924 | United Kingdom | 188/31 |
| 787787 | 12/1957 | United Kingdom | 188/111 |
| 1224968 | 3/1971 | United Kingdom | 280/33.99 C |

*Primary Examiner*—George E. A. Halvosa
*Attorney, Agent, or Firm*—Jessup & Beecher

[57] ABSTRACT

A boundary responsive wheel lock assembly for a supermarket shopping cart, or the like, or for any other application where a wheeled device is to be boundary responsive, is provided, to prevent the removal of the cart from an authorized area. The assembly includes a roller which is mounted on the distal end of an arm which, in turn, is pivotally mounted to a bracket to be positioned adjacent to one of the wheels of the cart. A spring-loaded plunger is also mounted on the bracket, and the plunger is normally held in a cocked position by the arm as the roller moves along the floor of the supermarket or along the surface of the adjacent parking lot. The parking lot is surrounded by a barrier which extends, for example, one and a half inches above the ground. However, the flexibility of the assembly of the invention enables the assembly to respond to a variety of boundary heights. Any attempt to remove the cart from the parking lot causes the roller to roll up the barrier and thereby causes the pivotally mounted support arm to turn about its pivot axis and release the plunger. The plunger then moves against the side of the adjacent wheel of the cart and is received in a slot in the wheel to lock the wheel. The assembly may be reset by an authorized employee, by inserting a key into a slot in the plunger mechanism, and by turning the key to force the plunger back against the biasing spring, and by then turning the arm to its normal angular position in which it holds the plunger in its cocked condition.

4 Claims, 4 Drawing Figures

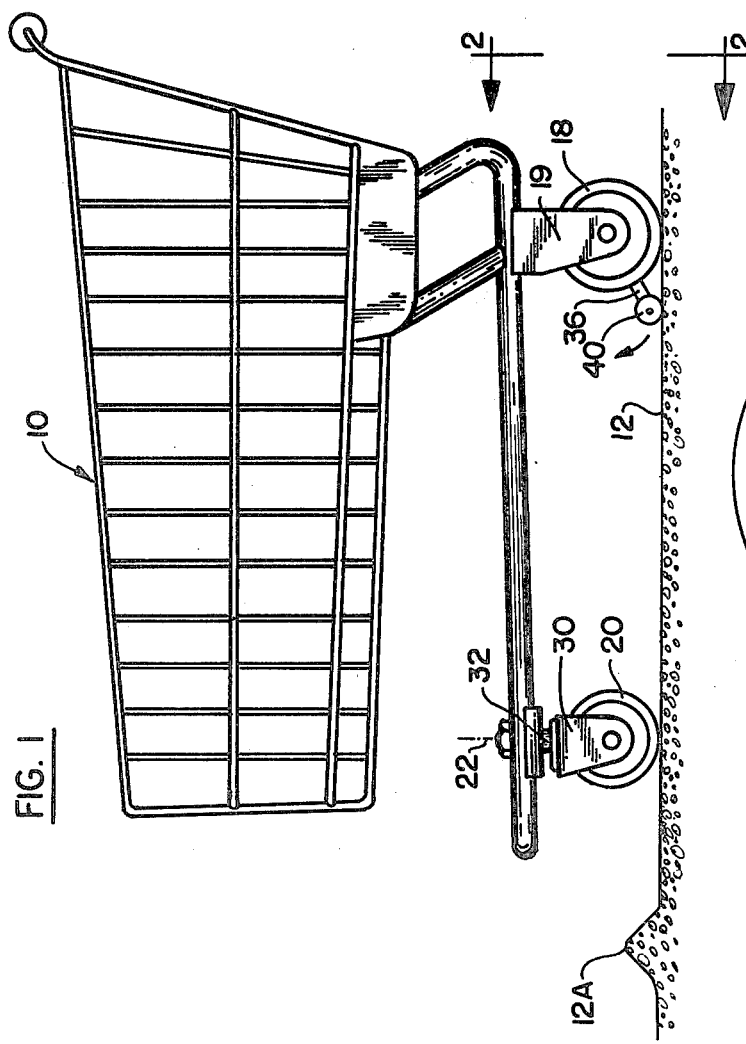
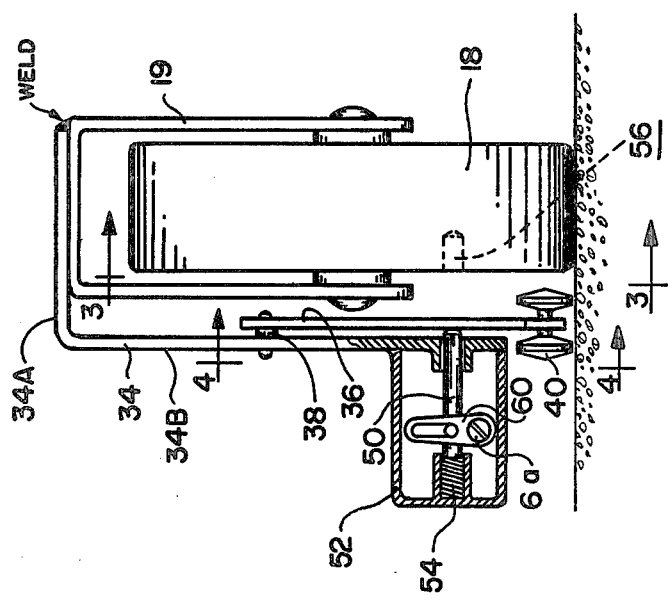
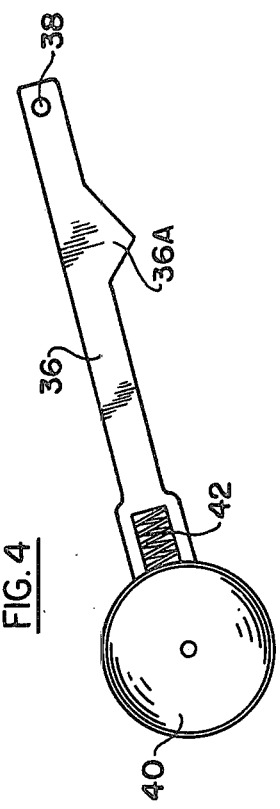
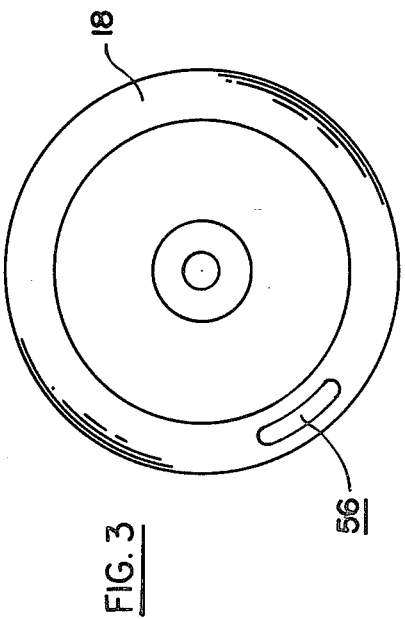

LOCK ASSEMBLY FOR SHOPPING CART TO PREVENT ITS REMOVAL FROM AN AUTHORIZED AREA

BACKGROUND OF THE INVENTION

It is usual practice in supermarkets for the customer to serve himself from the stocked shelves of merchandise, and it is also the practice in such supermarkets to furnish shopping carts for use by the customer while making his selections and for carrying the selections to the check-out counter. Where automobile parking areas are provided, the customer is usually permitted to wheel the shopping cart beyond the check-out counter to his parked automobile in order that he may conveniently transfer his purchases from the cart to the automobile. It has been found that an appreciable number of customers residing within walking distance of the supermarket often wheel the shopping carts to their homes. The carts are then carelessly abandoned by the customer as a usual practice. This has resulted in large and continuing loss to the market of expensive shopping carts, and it is the principal objective of this invention to minimize such losses without straining customer relationships.

The foregoing is achieved by providing a low boundary around the parking area adjacent to the supermarket. The low boundary does not impose any barrier to normal automobile and pedestrian traffic, and it is in no way dangerous, nor is it expensive to construct. The customer is free to wheel the shopping cart anywhere within the market, and anywhere within the parking area. However, any attempt to remove the shopping cart from the parking area causes the aforementioned roller to roll up the barrier and release the spring-loaded plunger so that the cart is immediately locked, and can no longer be moved. Even if a customer attempts to lift the cart over the barrier, the plunger is released and the cart is locked.

An advantage of the locking assembly of the invention is that it can be readily and conveniently installed in existing shopping carts. Another advantage is the fact that the mechanism is simple in its construction, and can be readily manufactured at a minimum cost. The assembly also exhibits low maintenance requirements; normal maintenance requiring, for example, a few drops of oil every two or three months. Yet another advantage is the fact that the assembly of the invention, once tripped, can be readily reset with the proper key to its normal position by an authorized employee.

BRIEF DESCRIPTION OF THE DRAWING

FIG. 1 is a side elevation of a typical shopping cart in which the locking assembly of the present invention has been installed adjacent to one of its rear wheels;

FIG. 2 is a front view, partly in section, taken essentially along the line 2—2 of FIG. 1, and showing the locking assembly of the invention and the manner in which it is mounted adjacent to one of the wheels of the shopping cart;

FIG. 3 is a side elevation of the aforesaid wheel of the shopping cart taken essentially along the line 3—3 of FIG. 2; and FIG. 4 is a side view of certain of the components of the locking assembly, taken essentially along the line 4—4 of FIG. 2.

DETAILED DESCRIPTION OF THE ILLUSTRATED EMBODIMENT

A typical shopping cart is designated 10 in FIG. 1, the shopping cart having a pair of rear wheels, such as the wheel 18, and a pair of front wheels, such as the wheel 20, the front wheels being preferably mounted for rotatable movement about a vertical axis 22.

The rear wheels, such as wheel 18, are rotatably mounted in brackets, such as a bracket 19. The front wheels, such as wheel 20 are rotatably mounted in brackets, such as bracket 30 which, in turn, is rotatably mounted on a vertical shaft 32 (FIG. 1). The lock assembly of the invention includes a bracket 34 which has an upper section 34A that extends over the top of bracket 19 (FIG. 2), and is attached thereto by appropriate means, such as by welding. The bracket 34 also has a section 34B which extends down adjacent the inner side of wheel 18 in essentially spaced and parallel relationship to the wheel.

An arm 36 is pivotally mounted to section 34B of bracket 34 by a mounting pin 38, or equivalent device. A roller 40 is rotatably mounted to the distal end of arm 36. As shown in FIG. 4, roller 40 is spring-biased by a spring 42, so that it is capable of reciprocal movement along the axis of the arm. The arm 36 itself may be spring-biased in a counterclockwise direction in FIG. 1 by an appropriate spring extending between the arm and bracket 19.

Roller 40 is intended to roll along the supporting surface 12 of the cart, as shown in FIG. 1, and which, for example, may be the floor of the supermarket or the surface of the adjacent parking lot.

A plunger 50 is mounted in a housing 52 on section 34B of bracket 34, and the plunger extends through a hole in the bracket, as best shown in FIG. 2. A spring 54 biases the plunger 50 to the right in FIG. 2. During normal operation of the cart, the plunger is blocked by the arm 36 and is held in a cocked position, such as shown in FIG. 2.

The parking area is surrounded by a barrier, such as barrier 12a in FIG. 1, which extends, for example, about 1 or 1½ inches above the surface of the parking lot. Any attempt to remove the shopping cart 10 from the parking lot causes roller 40 to roll up the barrier and thereby causes the arm 36 to swing and release the plunger 50. Spring 54 then biases plunger 50 against the side of wheel 18, and as the wheel is turned, the plunger is received in an arcuate slot 56 in the side of the wheel, so that the wheel is effectively locked.

A link 60 is provided in the housing 52, one end of the link being pivoted to the plunger 50, and the other being secured to a shaft 6a. One end of shaft 6a is slotted to receive an appropriate key, so that the plunger 50 may be turned back to its cocked position of FIG. 2 for resetting purposes.

When the aforementioned spring is used between the arm 36 and bracket 19, any attempt to lift the cart will enable the arm to turn under the force of the spring and release the plunger. If it is difficult to cut the arcuate slot 56 into the wheel, a separate slotted disc may be welded to the wheel to receive the plunger 50.

The intermediate portion of the arm 36 may have a protuberance, such as a protuberance 36a in FIG. 4, so that the plunger 50 will not be released by normal bounce encountered during the operation of the shopping cart, and so that the arm 36 must be swung through a predetermined angular arc before the plunger is released.

It will be appreciated that the lock assembly of the invention is simple in its construction, is easy to operate, and may be easily mounted on existing shopping carts.

It will also be appreciated that although a particular embodiment of the invention has been shown and described, modifications may be made. It is intended in the claims to cover the modifications which come within the spirit and scope of the invention.

What is claimed is:

1. A lock assembly for a shopping cart, or the like, to be mounted adjacent to one of the wheels of the cart, the wheel having a slot therein, said assembly including: a bracket to be attached to the shopping cart having a section extending in spaced relationship with the wheel; a plunger mounted on the bracket for reciprocal movement in a direction parallel to the axis of rotation of the wheel between a cocked position and a second position in which the plunger is received in the slot in the wheel; spring means mounted in said bracket and engaging the plunger for biasing the plunger towards its second position; an arm pivotally mounted on the bracket and movable angularly about an axis parallel to the axis of rotation of the wheel between a first angular position in which the arm is interposed between the plunger and the wheel to hold the plunger in its cocked position, and a second angular position in which the arm is angularly displaced from the first angular position to release the plunger to its second position; and a roller mounted on the distal end of the arm to engage the surface supporting the wheel, said roller normally holding the arm in an angular position inclined to the vertical, and said roller serving to turn the arm from its first to its second angular position when a protuberance on the supporting surface is encountered thereby and when the roller rolls up the protuberance.

2. The lock assembly defined in claim 1, and which includes a linkage member coupled to the plunger, and shaped to receive a key to be manually turnable by the key to move the plunger back against the force of the spring means to its first cocked position.

3. The lock assembly defined in claim 1, in which said roller is mounted on the distal end of the arm for limited reciprocal movement thereof along the longitudinal axis of the arm, and which includes spring means mounted in said arm and engaging the roller for biasing the roller toward the distal end of the arm.

4. The lock assembly defined in claim 1, in which the arm has a protuberance formed on an intermediate position thereof for providing a predetermined threshold of angular movement of the arm before the plunger is released.

* * * * *